United States Patent [19]

Inoue et al.

[11] Patent Number: 4,548,469
[45] Date of Patent: Oct. 22, 1985

[54] REAR PROJECTION SCREEN

[75] Inventors: Masao Inoue; Shingo Suzuki, both of Tokyo; Syozo Saito, Ageo, all of Japan

[73] Assignee: Mitsubishi Rayon Co., Ltd., Tokyo, Japan

[21] Appl. No.: 618,160

[22] Filed: Jun. 7, 1984

[51] Int. Cl.$^4$ ............................................. G03B 21/60
[52] U.S. Cl. ....................................................... 350/128
[58] Field of Search .................................. 350/127–129

[56] References Cited

U.S. PATENT DOCUMENTS

| | | | |
|---|---|---|---|
| 4,054,907 | 10/1977 | Itoh et al. | 350/128 X |
| 4,418,986 | 12/1983 | Yata et al. | 350/128 |
| 4,468,092 | 8/1984 | Inoue et al. | 350/128 |
| 4,469,402 | 9/1984 | Yata et al. | 350/128 |
| 4,490,010 | 12/1984 | Honda et al. | 350/128 |
| 4,509,823 | 4/1985 | Moriguchi et al. | 350/128 |

Primary Examiner—Richard A. Wintercorn
Attorney, Agent, or Firm—Armstrong, Nikaido, Marmelstein & Kubovcik

[57] ABSTRACT

A rear projection screen has a viewer's side and a projection side on which the image of a source is projected so that the projected image is visible from the viewer's side through the screen. The rear projection screen has a lenticular lens formed on the viewing side and including a multiplicity of vertically extending lens units each being provided at its both sides with total reflection surfaces. The lenticular lens further includes a multiplicity of horizontally extending lens units which diffuse the light in the vertical direction. The angular field of vision is increased in the horizontal direction by the vertical lens units and also in the vertical direction by the horizontally extending lens units.

3 Claims, 12 Drawing Figures

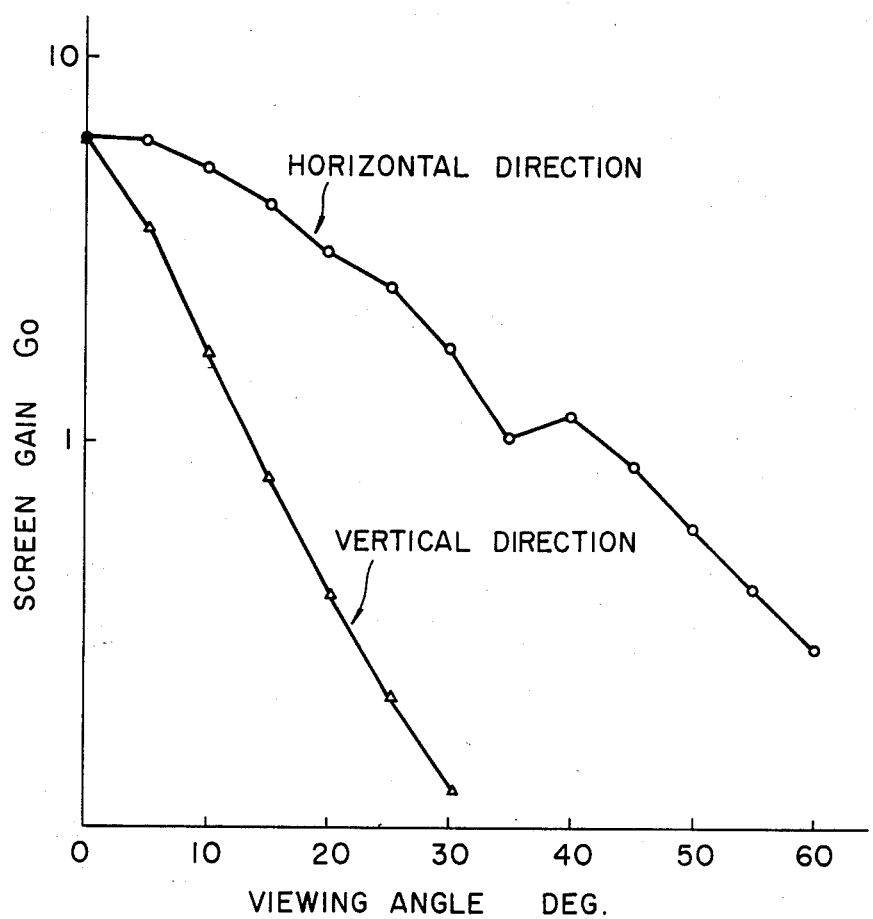

REAR PROJECTION SCREEN

BACKGROUND OF THE INVENTION

The present invention relates to a rear projection screen improved to increase the field of vision not only horizontally but vertically as well.

The rear projection screen used for a video projection screen is required to have a high brightness and a wide field of vision for making the image more visible and distinct from a wider angle of vision. To this end, hitherto various measures have been taken, such as, for example, the provision of lenticulation to the surface of the screen plate. The lenticulation of the screen plate, however, can widen the angular field of vision only up to 30° or so around the optical axis. Therefore, there has been a continuous demand to further increase the field of vision.

From this point of view, the applicants have already proposed a rear projection screen having a lenticulated screen plate in which a part of the light coming from a light source and impinging upon the screen is emitted to the viewing side through total-reflection by the total-reflection surfaces on the vertical lenticule units formed in the lenticulated screen plate. Such a rear projection screen is shown, for example, in the specifications of the U.S. patent application Ser. Nos. 364,193 and 467,509, as well as in the specifications of EP application Nos. 0063317 and 0087753. Using this lenticulated screen plate, it is possible to remarkably widen the visible field in the horizontal direction. Unfortunately, however, these lenticulated screen plates cannot widen the field of vision in the vertical direction. To widen the field of vision also vertically, it has been necessary to form a layer of diffusion agent or to mix a diffusion agent in the material of the screen. Although the use of the diffusion agent is effective to some extent, the light transmittance is lowered to decrease the contrast undesirably, if the concentration of the agent is excessively large. To the contrary, when the concentration of the diffusion agent is lowered, the screen becomes transparent to make the light source visible through the screen plate. It is, therefore, not a better policy to widen the angular field of vision in the vertical direction solely by the diffusion agent.

SUMMARY OF THE INVENTION

In view of the foregoing, the invention aims, as its primary object, at providing a rear projection screen in which the angular field of vision can be widened both horizontally and vertically with a good balance without impairing the resolution and other factors.

To this end, according to the invention, there is provided a rear projection screen having a viewing side and a projection side, the rear projection screen comprising: a lenticular lens formed on the viewing side and including a multiplicity of vertically extending lens units. The lenticular lens is constituted by lens units provided with total reflection surfaces and lens units having no total reflection surfaces.

The above and other objects, features and advantages of the invention will become more clear from the following description of the preferred embodiments taken in conjunction with the accompanying drawings.

BRIEF DESCRIPTION OF THE DRAWINGS

FIG. 9 is a graph showing the light transmitting characteristics of a rear projection screen of the comparison Example of the invention.

DESCRIPTION OF THE PREFERRED EMBODIMENTS

Figure 1:
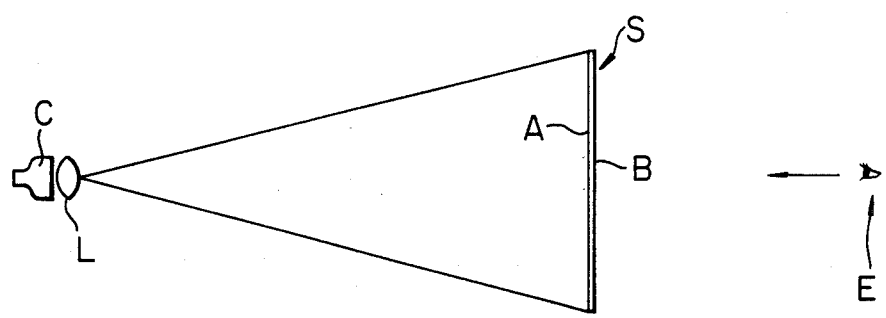
FIG. 1 is a schematic illustration of a projection system making use of a rear projection screen proposed by the present invention.

FIG. 1 shows a projection system making use of a rear projection screen, proposed by the invention. This system has a CRT(C) as a light source and a screen (S) on the rear side (A) of which an image from the CRT(C) is projected through a projection lens (L) to permit the viewers to view the projected image from the viewer's side (B) of the screen (S). When this projection system is used as, for example, a projection TV system, it is necessary that the screen has not only a high brightness and a wide angular field of vision in the horizontal direction but also in the vertical direction. As described before, the present inventors have already proposed a rear projection screen in which the angular field of vision is widened in the horizontal direction by providing, on the viewer's side of the screen, lenticular lenses having total reflection surfaces. The present invention aims at further widening the angular field of vision not only in the horizontal direction but also in the vertical direction.

Figure 2:
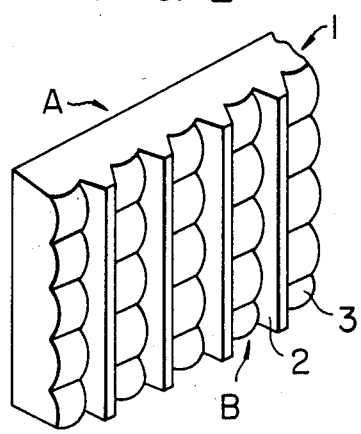
FIG. 2 is a perspective view of a part of an embodiment of the invention.
Figure 3:
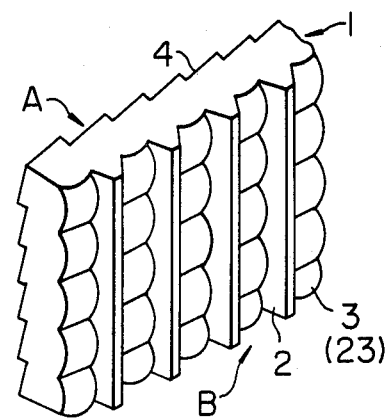
FIG. 3 is a perspective view of a part of the embodiment shown in FIG. 2 combined with a Fresnel lens.
Figure 4:
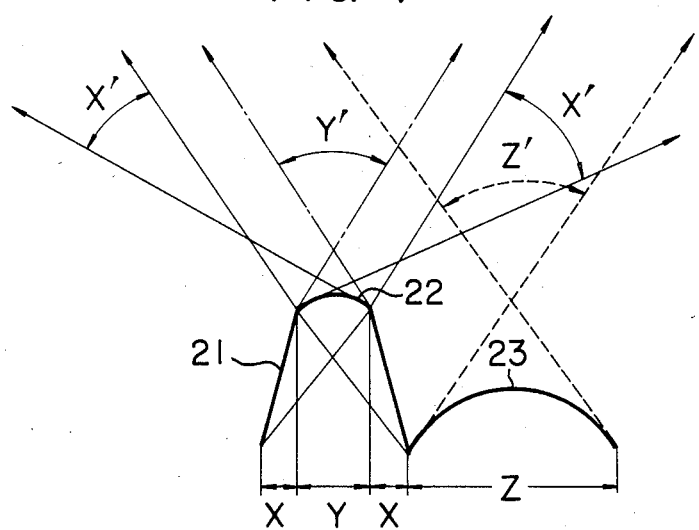
FIG. 4 is an illustration of optical path as obtained when the embodiment shown in FIG. 3 is used as a screen plate.

FIGS. 2 through 4 in combination show embodiments of the invention. In these embodiments, the lenticular lens is composed of lens units 2 having total reflection surfaces and lens units 3 having no total reflection surfaces. Namely, as will be seen from these Figures, a screen base member 1 in these embodiments has a lenticular lens on which columnar lens units 2 having total reflection surfaces and columnar lens units 3 having no total reflection surface are formed, alternatingly. Lens unit having no total reflection surface is formed with refraction elements 23 which are adapted to diffuse the light in the direction perpendicular to the longitudinal axis of the lens unit. In this embodiment, the light is transmitted in a manner which will be explained hereinunder with reference to FIG. 4. Namely, the lights X, X coming straight into the total reflection surfaces 21 are totally reflected by these surfaces and come out as lights X', X'. On the other hand, the lights Y and Z coming straight into the crest portion 22 and an adjacent lens 23 come out as lights Y' and Z'. In this case also, a wide angular field of vision, for example 30° to 45° of β value in horizontal direction is provided by the lens units having the total reflection surfaces.

The "β value" mentioned above is the inclination angle of the light to the optical axis, at which the gain is decreased to ½ of the maximum gain Go.

Go=foot Lambert (ft · L)/foot candle (ft · cd)

This can be frequently used as one of the indexes of the brightness of the screen. In addition, a part of the incoming light can be slightly diffused in the vertical direction by the refraction elements 23 on the lens units 3 having no total reflection surface. In consequence, it is possible to obtain a rear projection screen which has a well-balanced angular field of vision enhanced, both vertically and horizontally. The projection side A of the screen base member 1 may be flat as shown in FIG. 2 also in this case, but a greater effect will be obtained by providing a Fresnel lens 4 as shown in FIG. 3. In this embodiment, the width of the lens unit having the total reflection surfaces 21 preferably ranges between 0.3 and 0.6 mm, while the lens having, for example, a circular form but no total reflection surfaces has a width of 0.6 to 0.9 mm. The width of the lens used as a refraction index 3 has a thickness which preferably ranges between 0.9 and 2.0 mm.

Figure 5:
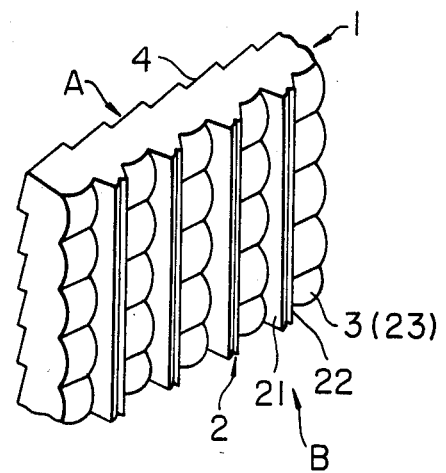
FIG. 5 is a perspective view of another embodiment of the invention.
Figure 6:
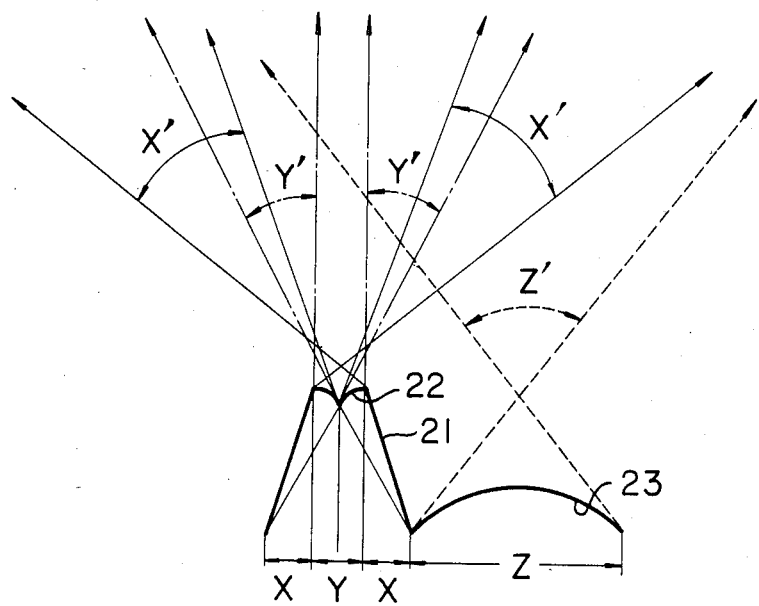
FIG. 6 is an illustration of light path as obtained when the embodiment shown in FIG. 5 is used as a screen plate.

FIGS. 5 and 6 show a modification of the embodiment shown in FIGS. 2 through 4. In this modification, the crest portion 22 of each lens unit having total reflection surfaces 21 is constituted by two curved sections, and columnar lens units having total reflection surfaces 21 and the columnar lens units having no total reflection surfaces are arranged alternatingly. This modification, therefore, has light-transmitting characteristics which are basically same as that of the embodiment shown in FIGS. 2 through 4. Namely, the lights X, X coming straight into the total relfection surfaces 21 come out as indicated by X', X', while the lights Y, Z coming straight into the crest portion 22 and an adjacent lens 23 come out as indicated by Y', Y' and Z', so that a large angular field of vision can be obtained in the horizontal direction. On the other hand, horizontally extending lenticular lenses. That is, the refraction elements 23, formed on the lens units 31 having no total reflection surfaces, effect a vertical refraction of a part of the light to widen the visible field also in the horizontal direction.

The rear projection screen of the invention may be made from a transparent material merely itself or containing a diffusion agent. Namely, in such a case, the diffusion agent is uniformly mixed with the material of the screen base member 1. Inorganic diffusion agents such as $SiO_2$, $CaCO_2$, $Al_2O_3$, $TiO_2$, $BaSO_4$, $ZnO$ and glass powder, as well as organic diffusion agents, can be used effectively as the diffusion agent mixed with the material of the screen base member 1. In order to diminish the regular reflection on the surface, it is quite effective to form fine roughness on the viewer's side and/or projection side A of the screen. In the present invention, a screen base member 1 is preferably made of a synthetic resin having good light transmitting characteristics such as a methacrylic resin, polycarbonate resin and vinyl chloride resin. The rear projection screen of the invention is suitable for production from a synthetic resin material by, for example, hot press work, extrusion, injection molding or casting. Examples of the rear projection screen of the invention will be described hereinunder.

EXAMPLE

Figure 7A:
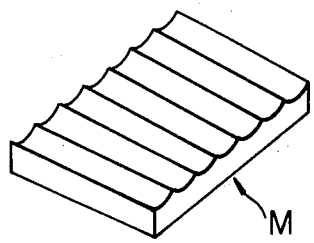
FIGS. 7A, 7B, 7C and 7D are illustrations of a mold for producing the rear projection screen of the Example and the shapes of the lens unit.
Figure 7B:
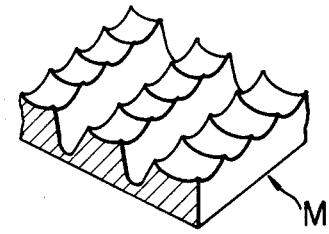
Figure 7C:
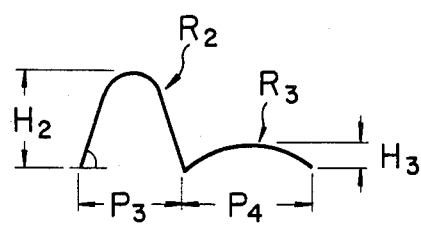
Figure 7D:
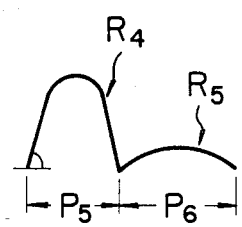
Figure 8:
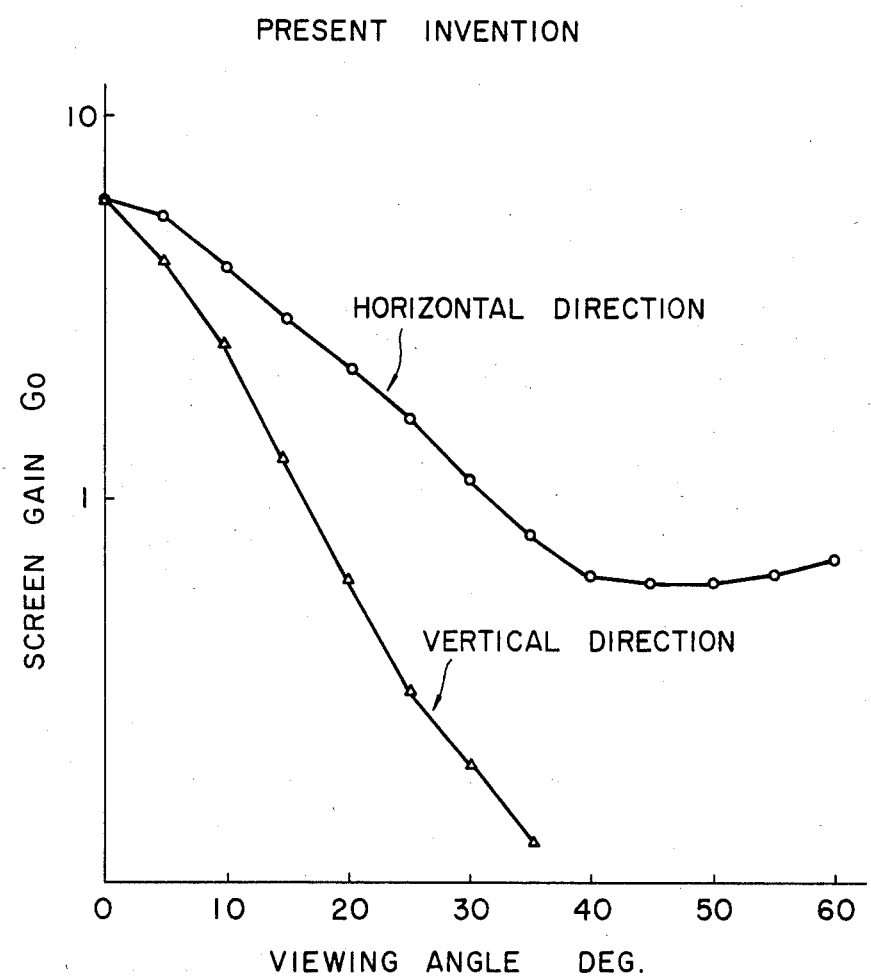
FIG. 8 is a graph showing the light transmitting characteristics of a rear projection screen as obtained in accordance with the Example of the invention.

As shown in FIG. 7A, recesses were formed in a mold half M. The recesses were formed at a pitch of 1.2 mm. The radius of curvature and depth of each recess was 1.2 mm and 0.143 mm, respectively. Then, this mold half was rotated to 90° and cut into a mold half as shown in FIG. 7B. Using this mold half together with the mold half having the Fresnel lens surface of a focal length f=1.1 m, a rear projection screen having a basic form of lenticular lens as shown in FIG. 7C was produced from an acrylic resin having a refractive index of 1.49 by a hot press at a temperature of 180° C. under a pressure of 40 kg/cm². As a light diffusion agent, 23 g/m² of $SiO_2$ was mixed with the methacrylic resin. Lens heights $H_2$ and $H_3$ were 0.295 mm and 0.143 mm, respectively, while radii of curvature $R_2$ and $R_3$ were 0.065 mm and 0.5 mm, respectively. Widths $P_3$ and $P_4$ of the lenses were 0.3 mm and 0.7 mm, respectively. As a reference article for comparison, a rear projection screen having a lenticular lens shaped and sized as shown in FIG. 7D but no lenticular lens serving as the refraction element 23 was produced from the same material and under the same conditions as Example. Table and FIGS. 8 and 9 show optical characteristics of these two rear projection screens. As in the case of Example, the rear projection screen of the invention provides a greater angular field of vision in the vertical direction than the reference article, although the angular field of vision in the horizontal direction is somewhat smaller than that in the reference article.

TABLE

| | Characteristic values | | |
|---|---|---|---|
| | Go | α* | β |
| Rear projection screen of invention | | | |
| Horizontal direction | 6 | 15 | 23 |
| Vertical direction | 6 | 9 | 12 |
| Reference article for comparison | | | |
| Horizontal direction | 6.2 | 20 | 28 |
| Vertical direction | 6.2 | 6 | 9 |

*α value represents ½ of the value Go

As has been described, according to the invention, it is possible to obtain a rear projection screen in which the angular field of vision is increased both in the horizontal direction and vertical direction well-balanced. In the visible field, thanks to a cooperation between the vertically diffusing lenticular lens and horizontally diffusing lenticular lens.

What is claimed is:

1. A rear projection screen having a viewer's side and a projection side, said rear projection screen comprising: a lenticular lens formed on said viewer's side and including a multiplicity of vertically extending lens units, said lenticular lens is constituted by lens units provided with total reflection surfaces and lens units having no total reflection surfaces, and refraction elements for vertically diffusing the light are formed on the lens units having no total reflection surfaces.

2. A rear projection screen according to claim 1, wherein said refraction elements are formed of horizontally extending lens units.

3. A rear projection screen according to claim 1 or 2 wherein said screen has a Fresnel lens formed on said projection side thereof.

* * * * *